June 12, 1923.
A. W. LISSAUER ET AL
1,458,490
HUMIDIFYING APPARATUS CONTROL
Filed Dec. 17, 1919
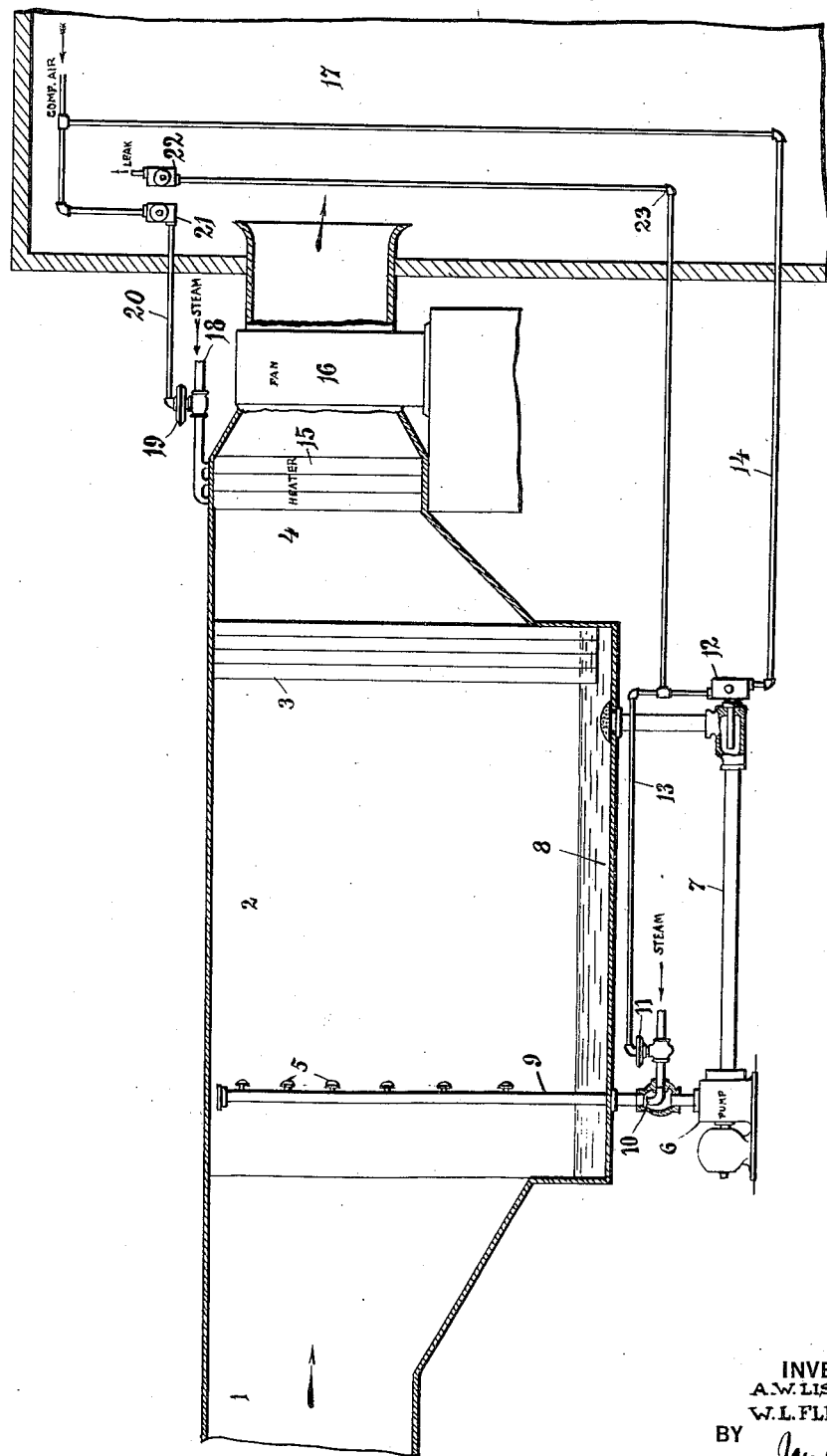
INVENTOR
A.W. LISSAUER
W.L. FLEISHER
BY
ATTORNEY Patented June 12, 1923.

1,458,490

UNITED STATES PATENT OFFICE.

ADOLPH W. LISSAUER AND WALTER L. FLEISHER, OF NEW YORK, N. Y., ASSIGNORS TO W. L. FLEISHER & CO. INC., OF NEW YORK, N. Y., A CORPORATION OF NEW YORK.

HUMIDIFYING-APPARATUS CONTROL.

Application filed December 17, 1919. Serial No. 345,647.

*To all whom it may concern:*

We, ADOLPH W. LISSAUER and WALTER L. FLEISHER, both citizens of the United States, and residents of the city, county, and State of New York, have invented a new and Improved Humidifying-Apparatus Control, of which the following is a full, clear, and exact description.

Our invention relates to a humidifying apparatus, and has reference more particularly to control means associated with the humidifying apparatus to prevent the precipitation of moisture from the moist air in predetermined places.

In textile mills where humidifying is done in the winter time for the elimination of static electricity from the goods while in the process of spinning or weaving, it has been found that in the morning when the mill is cold the moisture which is put into the air will deposit on and rust the machinery, thereby causing great damage and large repair bills. This is due to the fact that while the mill is cold the temperature would be below the dew point of the introduced air, with moisture sufficient to maintain the proper humidity conditions and temperature conditions if the mill were warm. As a consequence, the excess of moisture is precipitated on the machines with consequent inconvenience and trouble.

To obviate the precipitation of the moisture and the consequent inconvenience and trouble, we instal a thermostatic safety device operated by the temperature of the room and arranged so that the compressed air supply to the steam diaphragm valve used for injecting heating medium into the spray water, is shut off until the dry bulb temperature of the room is within a few degrees of the temperature which it is desired to maintain. In other words, we render the humidity control of the humidifier inoperative until the desired temperature is obtained in the room.

In the accompanying drawing forming part of this application, Figure 1 represents a diagrammatic sectional view through an apparatus embodying our invention.

Figure 2 is a section through a diaphragm valve used for admitting steam, and

Figure 3 is a section through a thermostat which may be used in conjunction with our invention.

Referring to the drawings 1 is the inlet duct leading to the humidifier chamber 2, in which a separator 3 is placed in front of the outlet duct 4 of the humidifier, spraying nozzles 5 being provided in the humidifier chamber 2 between the inlet duct 1 and the separator 3. The nozzles 5 are supplied with moisture by a pump 6, the inlet 7 of which is connected to the sump 8 of the humidifier chamber 2. The conduit 9 leading from the pump to the nozzles has a steam supply 10, controlled by a diaphragm valve 11. The flow of compressed air to the diaphragm 11 is controlled by a thermostat 12, influenced by the temperature of the water flowing from the sump to the pump. This thermostat is of a type manufactured by the Powers Regulator Company and known as #14B regulator. A conduit 13 connects the thermostat 12 to the diaphragm valve 11. Another conduit 14 leads from the supply of compressed air to the thermostat 12. The above described elements constitute the humidifier and the thermostat 12 with its connections to the diaphragm valve mentioned constitutes the humidity control. As shown in Figure 3, the thermostat 12, when the temperature of the water increases, it expands and shuts off the supply of air from the pipe 14 to the pipe 13.

The outlet duct 4 is provided with a heater 15 for heating the air passing from the humidifier to the fan 16, which forwards the treated air to a chamber or enclosure 17. Heat is supplied to the heaters through a conduit 18 which is provided with a diaphragm valve 19 operable by compressed air supplied thereto by a conduit 20. In said conduit 20 is cut-in a thermostat 21 located in the enclosure 17, which thermostat is adapted to maintain the desired temperature in the chamber or enclosure 17. The said thermostat 21 is a graduate action instrument for controlling the air heating stack and is of the type L manufactured by the Powers Regulator Company.

The enclosure 17 carries also a thermostat 22 which is connected by a conduit 23 to the conduit 13, between the thermostat 12 and the diaphragm valve 11. The said thermostat 22 is set to leak out all air passing the thermostat 12 to the diaphragm valve 11, until the temperature in the enclosure 17 reaches within the desired number of degrees, the said temperature being controlled by the thermostat 21. Therefore the thermostat 22 renders the humidity control inoperative until the desired temperatur within the enclosure has been reached. When the desired temperature in the enclosure is reached it necessarily affects the thermostat 22 which stops the leakage of air from the thermostat 12 to the diaphragm valve 11. In consequence, permitting the thermostat 12 to thermally affect the water supplied to the nozzles. The thermostat 22 is a positive instrument of the type known as "K," manufactured by the Powers Regulator Company.

It may be remarked that in cases where the thermostat 21 fails and the temperature in the enclosure 17 drops, the thermostat 22 will cause a leak in the conduit 13, thereby preventing the thermostat 12 from supplying heat to the spray water and avoiding the danger of over-humidifying and consequent deposit of moisture in the enclosure 17.

In the applicant's arrangement when the temperature in the enclosure 17 is below that desired, the thermostat 21 will act on the diaphragm valve 19 to heat the air that passes through the enclosure 17. The thermostat 22 on the other hand, prevents steam from entering into the sprayed water, by locking out the compressed air which flows from the thermostat 12 of the humidity control. In other words, the operation of the humidity control is set for a definite temperature within the enclosure.

As an illustration suppose the dry bulb temperature is 80° with 68% relative humidity; this requires a dewpoint of the air in the room 17 of 68°. The thermostat 21 is set for 80° while the thermostat 22 is so set that the air from the humidity control system will leak out at all temperatures below 68°. Under the action of the heater 15 the temperature of the room 17 is built up but until the temperature in the room is above 68° the humidity control system remains inoperative, irrespective of the fact that the tendency of the thermostat 12 is to heat the spray water. It is self evident that at temperatures below 68° the moisture of the air in the room when the air is humidified would deposit on any objects that are in the room 17. In other words, the thermostat 22 prevents operation of the thermostat 12 until the temperature in the room 17 has risen above 68° and thereby prevents the humidification of the air until the proper temperature is obtained within the room 17.

We claim:

1. A humidifying apparatus control comprising in combination a chamber through which air may be circulated, means for creating a mist in said chamber, a pump for supplying water to the mist creating means, means for affecting thermally the water supplied to the mist creating means, a diaphragm valve associated with said means for thermally affecting the water, a thermostat adapted to be affected by the water drawn by the pump, means for operating the diaphragm valve controlled by said thermostat, an enclosure to receive the air treated in the chamber, a heater for the air flowing from the chamber to the enclosure, a thermostat in the enclosure to control the heater and a second thermostat located in said enclosure and connected to the means for operating the diaphragm valve, between the thermostat adapted to be affected by the water drawn by the pump and the said diaphragm valve, the said second thermostat in the said enclosure being adapted to prevent the operation of the said diaphragm valve by said thermostat, adapted to be affected by the water drawn by the pump, until a substantially predetermined condition is obtained within the said enclosure, substantially as and for the purposes set forth.

2. In combination with an enclosure of a humidifying apparatus control, comprising in combination a chamber through which air may be circulated, means for creating a mist in said chamber, a pump for supplying water to the mist forming means, means for affecting thermally the water supplied to the mist forming means, a diaphragm valve associated with the means for thermally affecting the water, a conduit for compressed air leading to said diaphragm valve, a thermostat adapted to be affected by the water drawn by the pump, a cut-in on the said conduit for the compressed air and whereby said thermostat is adapted to control the said diaphragm valve; an enclosure adapted to receive air treated in the chamber, a heater for the air flowing from the chamber to the enclosure, a thermostat located in the enclosure for controlling the heater, another thermostat in said enclosure, a conduit connecting the said other thermostat in the enclosure to the part of the conduit for compressed air which connects the thermostat adapted to be affected by the water drawn by the pump to the diaphragm valve, the said other thermostat in the enclosure being set to cause a leak of compressed air flowing past the thermostat, adapted to be affected by the water drawn by the pump, to the diaphragm valve until a substantially predetermined temperature is obtained within the enclosure, substantially as and for the purposes set forth.

3. In combination with an enclosure, a humidifying apparatus control comprising a chamber through which air may be circulated before it enters the enclosure, a humidity control associated with the chamber, a heater for preheating the air coming from the chamber to the enclosure, a thermostat in the enclosure for controlling the heater, a second thermostat in the enclosure connected to the humidity control to prevent the operation of the said humidity control until a predetermined temperature is built up in the enclosure by the heater, substantially as and for the purposes set forth.

ADOLPH W. LISSAUER.
WALTER L. FLEISHER.